(12) United States Patent
Teper

(10) Patent No.: US 9,697,310 B2
(45) Date of Patent: Jul. 4, 2017

(54) LEVEL FAULTS INTERCEPTION IN INTEGRATED CIRCUITS

(71) Applicant: WINBOND ELECTRONICS CORPORATION, Taichung (TW)

(72) Inventor: Valery Teper, Petah-Tikwa (IL)

(73) Assignee: WINBOND ELECTRONICS CORPORATION, Taichung (TW)

( * ) Notice: Subject to any disclaimer, the term of this patent is extended or adjusted under 35 U.S.C. 154(b) by 37 days.

(21) Appl. No.: 14/929,423

(22) Filed: Nov. 2, 2015

(65) Prior Publication Data

US 2017/0124238 A1   May 4, 2017

(51) Int. Cl.
*G06F 17/50* (2006.01)

(52) U.S. Cl.
CPC ...... *G06F 17/5036* (2013.01); *G06F 17/5072* (2013.01); *G06F 17/5081* (2013.01); *G06F 2217/14* (2013.01); *G06F 2217/84* (2013.01)

(58) Field of Classification Search
CPC ............ G06F 17/5036; G06F 17/5081; G06F 17/5072; G06F 2217/14; G06F 2217/84
See application file for complete search history.

(56) References Cited

U.S. PATENT DOCUMENTS

| | | | | |
|---|---|---|---|---|
| 6,110,213 A * | 8/2000 | Vinciarelli et al. | ..... | G06F 17/50 703/1 |
| 6,355,387 B1 * | 3/2002 | Fujinaga et al. | ......... | G03F 1/70 430/30 |
| 6,690,704 B2 * | 2/2004 | Fallon et al. | ....... | G03F 7/70025 372/55 |
| 6,775,818 B2 * | 8/2004 | Taravade et al. | ... | G06F 17/5036 703/14 |
| 6,894,712 B2 * | 5/2005 | Ishikawa et al. | .. | B23K 26/0604 347/239 |
| 6,898,780 B2 * | 5/2005 | Egorov et al. | ............ | G03F 1/36 716/134 |
| 7,328,424 B2 * | 2/2008 | Köhle | ....................... | G03F 1/36 703/2 |
| 7,418,693 B1 * | 8/2008 | Gennari et al. | ..... | G06F 17/5068 716/55 |

(Continued)

OTHER PUBLICATIONS

Heather M Quinn et al, "Fault Simulation and Emulation Tools to Augment Radiation-Hardness Assurance Testing", IEEE Transactions on Nuclear Science, IEEE Service Center, New York, NY, US, (Jun. 1, 2013), vol. 60, No. 3, pp. 2119-2142.

(Continued)

*Primary Examiner* — Naum B Levin
(74) *Attorney, Agent, or Firm* — Soroker Agmon Nordman

(57) ABSTRACT

There is provided a computerized mechanism for vulnerability evaluation in a layout having circuitry units as interceptors, comprising receiving a layout with interceptors incorporated therein at prearranged positions, virtually inducing faults in the layout by modeling a physical phenomenon that affects timings in the layout, detecting timing violations in the layout responsive to the induced faults based on discrepancies between the timings and provided specifications thereof determining vulnerability of the layout to faults according to detected faults, and wherein the method is performed on an at least one computerized apparatus configured to perform the method.

11 Claims, 4 Drawing Sheets

(56) References Cited

U.S. PATENT DOCUMENTS

| | | | | |
|---|---|---|---|---|
| 7,474,381 B2* | 1/2009 | Abuku | G03B 27/42 | 355/53 |
| 7,544,574 B2* | 6/2009 | Chiang et al. | B82Y 30/00 | 438/297 |
| 7,586,583 B2* | 9/2009 | Schellenberg | B82Y 10/00 | 355/53 |
| 7,603,648 B2* | 10/2009 | Liu | G03F 1/36 | 430/30 |
| 7,673,260 B2* | 3/2010 | Chen | G01R 31/31704 | 716/106 |
| 7,673,278 B2* | 3/2010 | Rathsack | H01L 22/20 | 716/56 |
| 7,735,053 B2* | 6/2010 | Harazaki | G03F 1/36 | 716/53 |
| 7,777,204 B2* | 8/2010 | Lapanik | B82Y 10/00 | 250/492.22 |
| 7,784,020 B2* | 8/2010 | Izuha | G06F 17/5031 | 716/119 |
| 7,823,102 B2* | 10/2010 | Chandra | G06F 17/5009 | 716/106 |
| 7,872,489 B2* | 1/2011 | Dickson | G01R 31/311 | 324/758.02 |
| 7,875,406 B2* | 1/2011 | Lin | G03F 1/00 | 430/311 |
| 7,894,917 B2* | 2/2011 | Weatherhead | G05B 23/0208 | 700/14 |
| 8,203,705 B2* | 6/2012 | Ooyama | G01B 11/306 | 356/237.1 |
| 8,214,771 B2* | 7/2012 | Adel | G03F 7/705 | 356/625 |
| 8,278,799 B1* | 10/2012 | Lupien | B06B 1/02 | 310/334 |
| 8,281,276 B2* | 10/2012 | Nonaka | G06F 17/5031 | 716/106 |
| 8,286,112 B2* | 10/2012 | Miranda | G06F 17/5031 | 716/110 |
| 8,341,576 B2* | 12/2012 | Horikoshi | G06F 17/5031 | 327/276 |
| 8,368,890 B2* | 2/2013 | Brunner | G01J 4/04 | 356/364 |
| 8,438,508 B2* | 5/2013 | Liu | G03F 1/144 | 716/51 |
| 8,490,034 B1* | 7/2013 | Torunoglu | G06F 17/5068 | 716/53 |
| 8,532,964 B2* | 9/2013 | Wei | G03F 1/36 | 703/2 |
| 8,627,247 B1* | 1/2014 | McCullen | G06F 17/5072 | 716/103 |
| 8,640,076 B2* | 1/2014 | Mina | G06F 17/5068 | 716/100 |
| 8,728,720 B2* | 5/2014 | Hwang | B82Y 30/00 | 430/320 |
| 8,767,179 B2* | 7/2014 | McKinsey | G03F 7/7005 | 355/67 |
| 8,893,060 B2* | 11/2014 | Feng | G03F 1/70 | 716/51 |
| 8,904,322 B2* | 12/2014 | Agarwal | G06F 17/5031 | 716/100 |
| 9,262,569 B2* | 2/2016 | Bickford | G06F 17/5068 | |
| 9,292,398 B2* | 3/2016 | Cook | G06F 11/27 | |
| 2005/0239223 A1* | 10/2005 | Mantz et al. | G01N 21/55 | 438/14 |
| 2007/0094623 A1* | 4/2007 | Chen et al. | G01R 31/31704 | 716/113 |
| 2007/0288822 A1 | 12/2007 | Lin | | |
| 2009/0007044 A1* | 1/2009 | Shibuya et al. | G06F 17/5045 | 716/122 |
| 2009/0199153 A1* | 8/2009 | Usui | G03F 7/705 | 716/55 |
| 2010/0219494 A1* | 9/2010 | Barnaby | B82Y 15/00 | 257/429 |
| 2011/0058729 A1* | 3/2011 | Inoue | G01N 21/956 | 382/144 |
| 2012/0286170 A1* | 11/2012 | Van De Peut | B82Y 10/00 | 250/397 |
| 2013/0096902 A1 | 4/2013 | Bose | | |
| 2015/0242554 A1* | 8/2015 | Dreibelbis | G06F 17/5031 | 703/2 |
| 2016/0092617 A1* | 3/2016 | Lee | G06F 17/5009 | 703/6 |
| 2016/0093539 A1* | 3/2016 | Nakanishi | H01L 21/26 | 250/341.4 |
| 2016/0162623 A1* | 6/2016 | Lutich | G06F 17/5081 | 716/51 |
| 2016/0303797 A1* | 10/2016 | Moran | B29C 67/0066 | |

OTHER PUBLICATIONS

Michael Gschwind et al, "SoftBeam: Precise tracking of transient faults and vulnerability analysis at processor design time", Computer Design (ICCD), 2011 IEEE 29th International Conference on, IEEE, (Nov. 9, 2011), pp. 404-410.

* cited by examiner

LEVEL FAULTS INTERCEPTION IN INTEGRATED CIRCUITS

BACKGROUND

The present disclosure generally relates to faults in integrated circuits, and more specifically to faults detection measures in integrated circuits designs.

Testing for security vulnerability integrated circuits as physical devices is excessively expensive, as in labor and consequences such as time to market, since fixing detected faults requires iterative full tape-out cycles.

SUMMARY

One exemplary embodiment of the disclosed subject matter is a computerized mechanism for vulnerability evaluation in a layout having circuitry units as interceptors, comprising receiving a layout with interceptors incorporated therein at prearranged positions, virtually inducing faults in the layout by modeling a physical phenomenon that affects timings in the layout, detecting timing violations in the layout responsive to the induced faults based on discrepancies between the timings and provided specifications thereof determining vulnerability of the layout to faults according to detected faults, and wherein the method is performed on an at least one computerized apparatus configured to perform the method.

In another some embodiment exemplary embodiment of the disclosed subject matter the physical phenomenon is a virtual laser beam having an intensity represented by a time factor and a diameter according which the layout is divided into partitions of cells and nets, the beam scanning the layout by the partitions and altering in the partitions specified timings of the cells and nets according to the time factor, and wherein detecting timing violations in the layout comprises detecting in each partition discrepancies between the timings of the cells and nets and provided specifications thereof, and wherein determining vulnerability of the layout to faults is according to detected timing violations outside of the interceptors.

In another some embodiment exemplary embodiment of the disclosed subject matter the physical phenomenon is a modeled electromagnetic irradiation.

BRIEF DESCRIPTION OF THE DRAWINGS

Some non-limiting exemplary embodiments or features of the disclosed subject matter are illustrated in the following drawings.

Identical or duplicate or equivalent or similar structures, elements, or parts that appear in one or more drawings are generally labeled with the same reference numeral, and may not be repeatedly labeled and/or described.

Figure 1A:
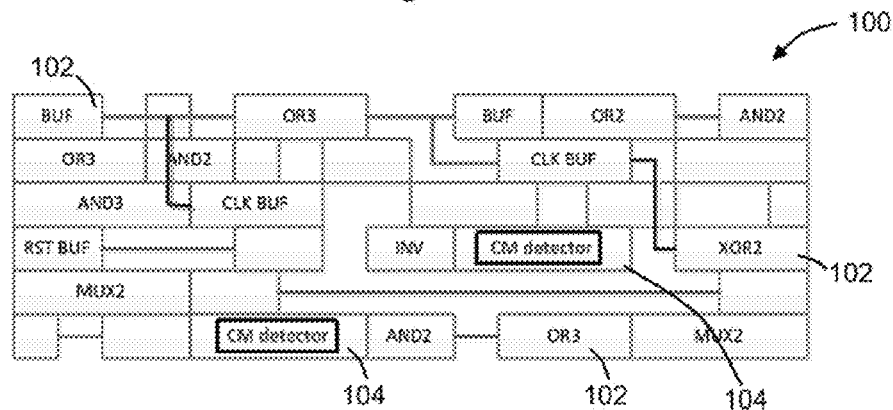

Dimensions of components and features shown in the figures are chosen for convenience or clarity of presentation and are not necessarily shown to scale or true perspective. For convenience or clarity, some elements or structures are not shown or shown only partially and/or with different perspective or from different point of views.

References to previously presented elements are implied without necessarily further citing the drawing or description in which they appear.

Figure 1B:
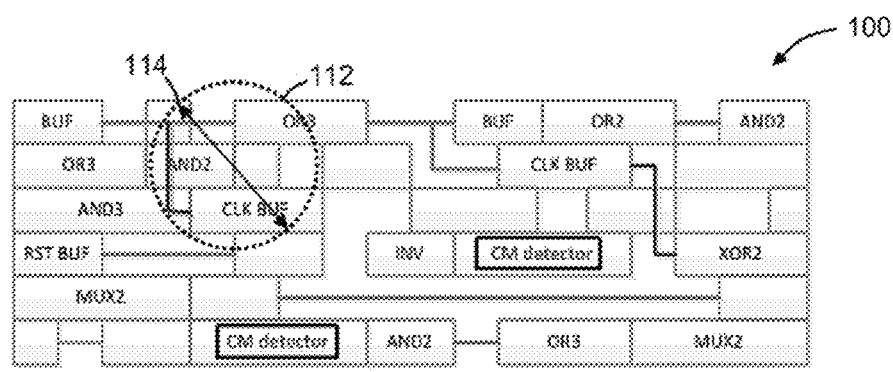
Figure 1C:
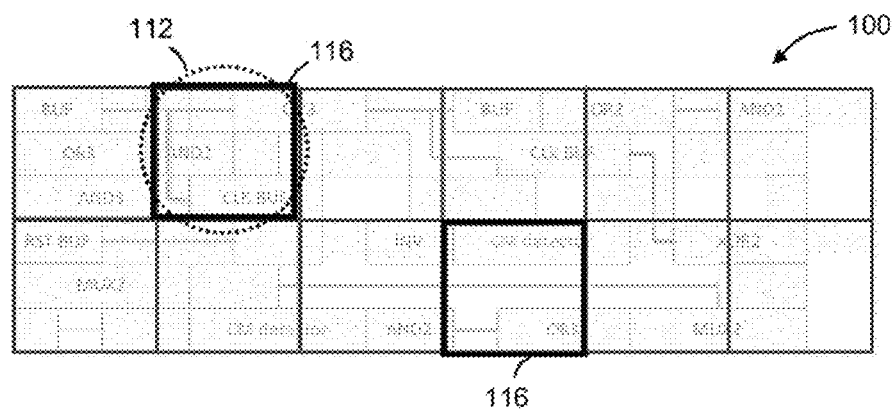
Figure 2A:
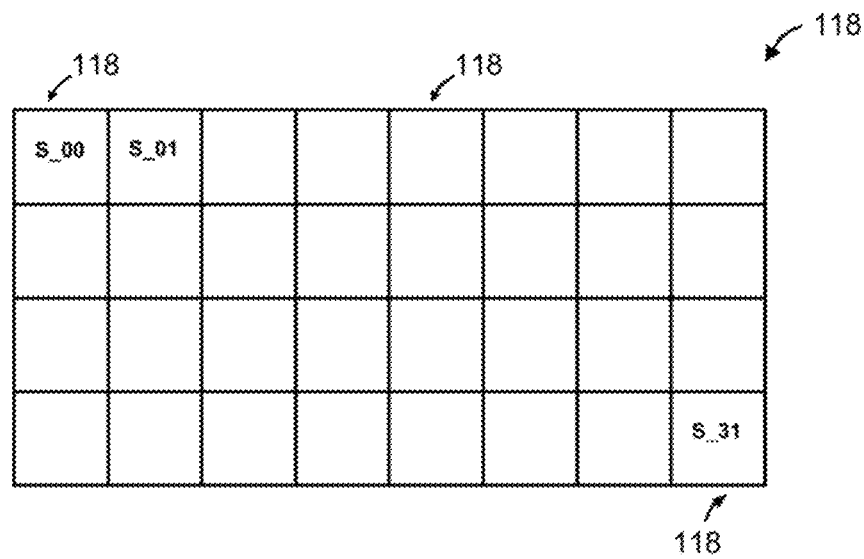
Figure 2B:
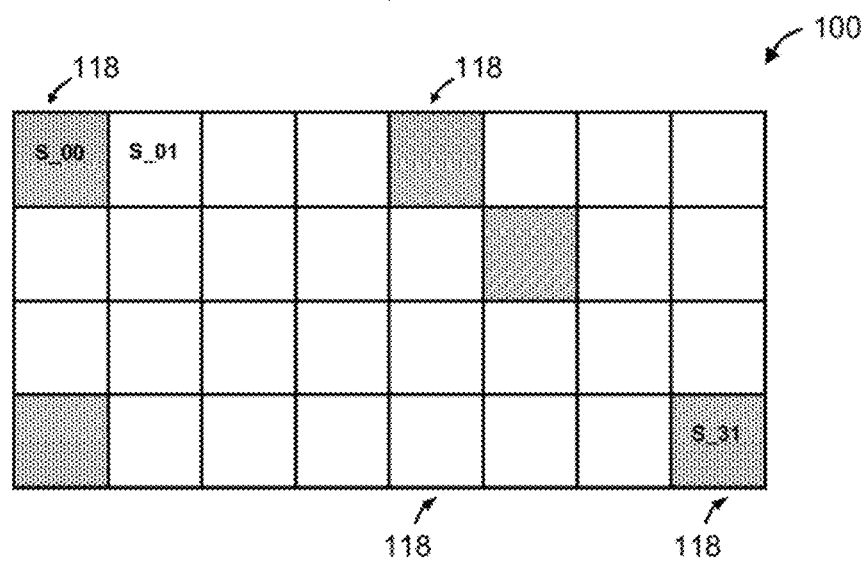
Figure 2C:
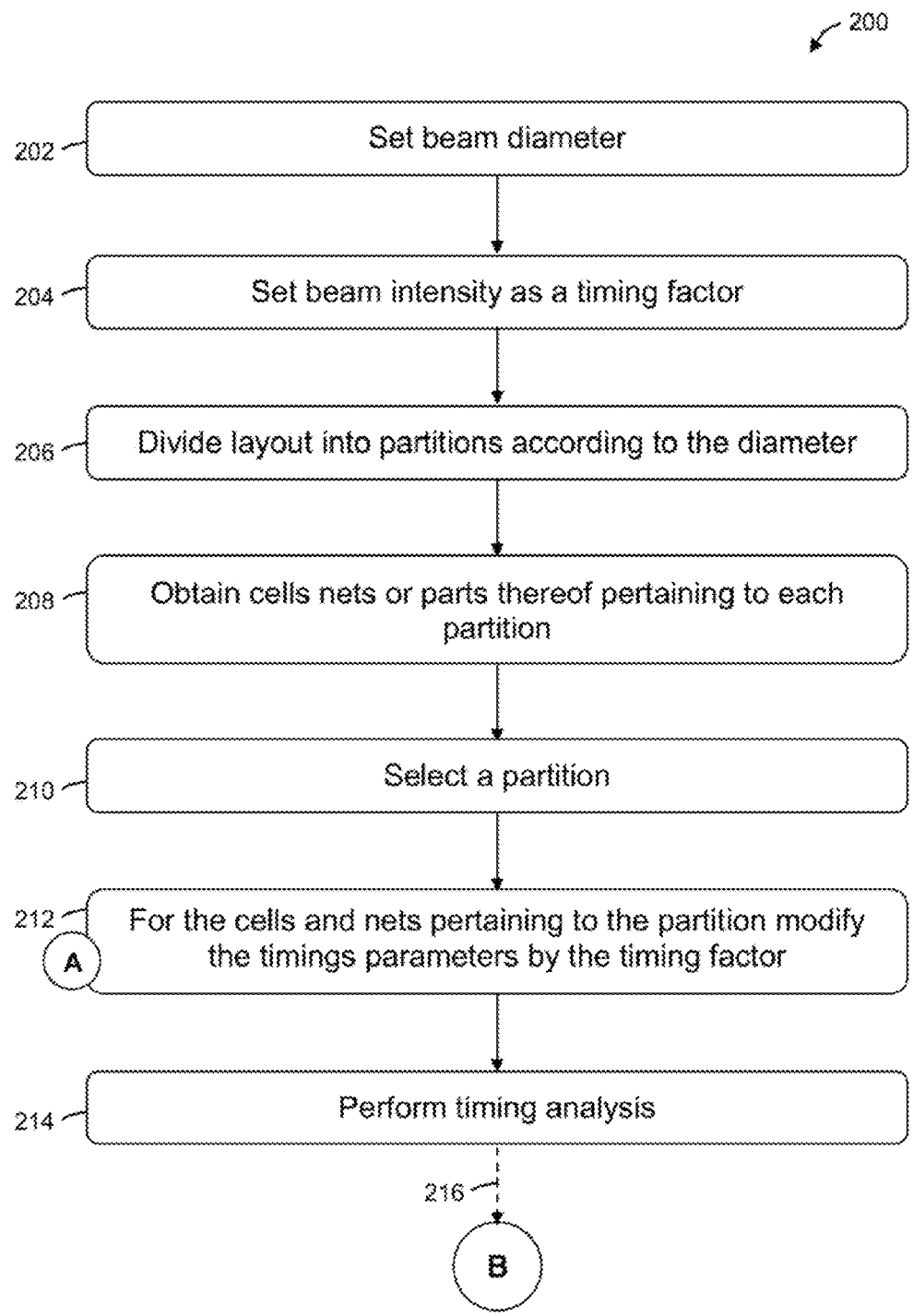
Figure 2C:
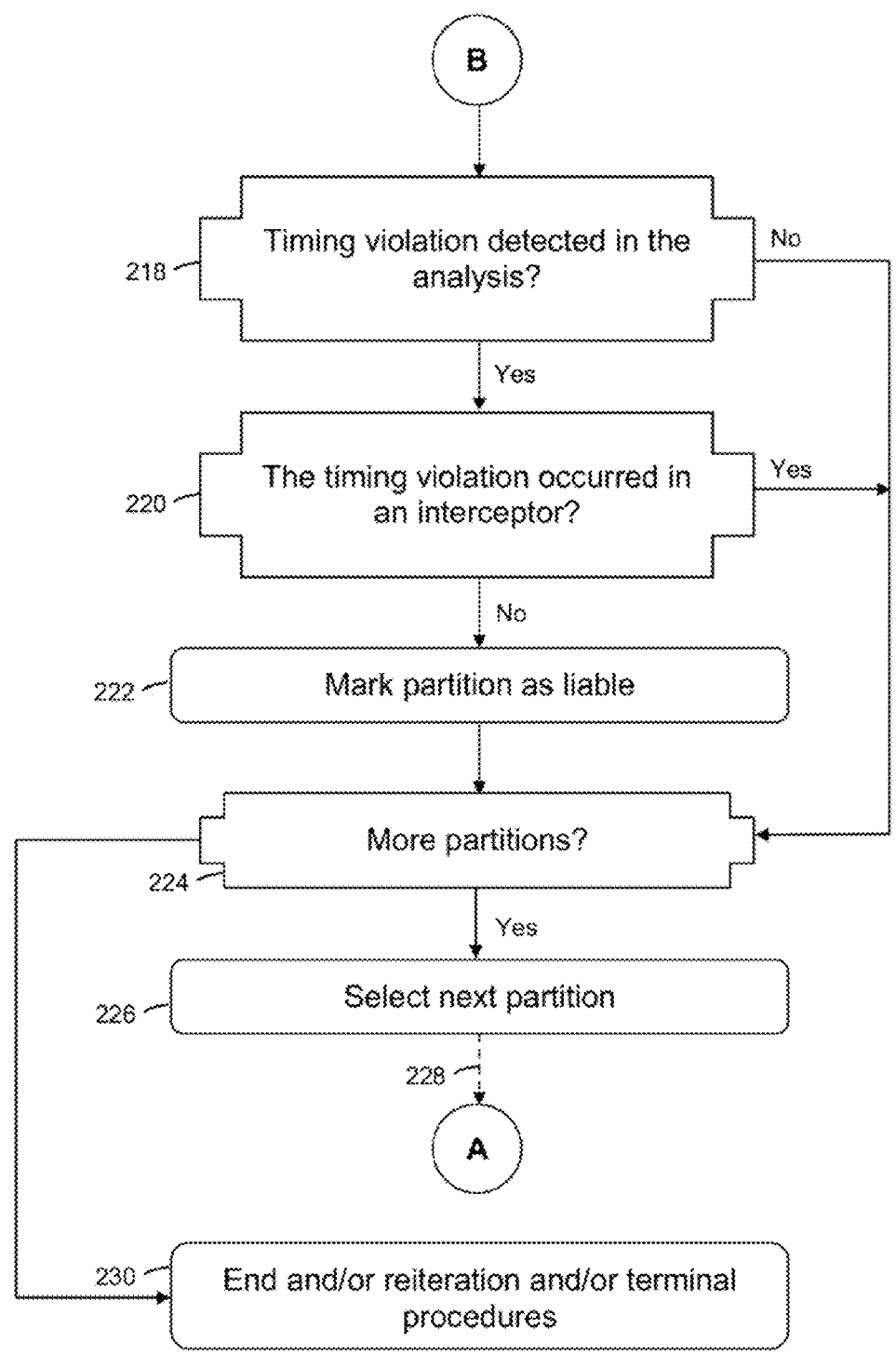

FIG. 1A schematically illustrates a layout of cells where some of which are interceptors, according to exemplary embodiments of the disclosed subject matter;

FIG. 1B schematically illustrates the layout of FIG. 1A with a representation of a laser beam irradiating the layout, according to exemplary embodiments of the disclosed subject matter;

FIG. 1C schematically illustrates a rectangular approximation of a circular beam, according to exemplary embodiments of the disclosed subject matter;

FIG. 2A schematically and concisely illustrates a layout akin to the layout of FIG. 1C with partitions, each partition denoted as a partition 118, based on repetitions of square 116, according to exemplary embodiments of the disclosed subject matter;

FIG. 2B schematically and concisely illustrates the layout and partitions as of FIG. 2A with indications of partitions that are liable to intrusion according to evaluation of fault interceptions, according to exemplary embodiments of the disclosed subject matter; and FIG. 2C schematically outlines operations in evaluating fault interception, according to exemplary embodiments of the disclosed subject matter.

DETAILED DESCRIPTION

In the context of the present disclosure and unless otherwise specified, circuitries are expressed in constructs of hardware description and/or by models where the operation thereof can be simulated or otherwise analyzed by suitable tools, such as, for example, Verilog or VHDL.

Likewise, unless otherwise specified, operations applied to circuits are virtually applied to the virtual circuits.

In the context of the present disclosure, without limiting, referring to 'virtual' entities or phenomena or occurrences implies an imitation or mimicking or modeling of the entities or phenomena or occurrences, respectively.

In the context of the present disclosure, without limiting, a 'layout' is a design layout of an electronic circuitry with placement of the components and interconnections therebetween.

In the context of the present disclosure, without limiting, a 'fault interceptor', or briefly an 'interceptor', implies a unit of circuitry such as a cell or a block comprising some logic elements of designed operation and/or properties that responsive to interference therewith or disturbance thereof exhibit functionalities or properties different than under undisturbed normal circumstances. Thus, by comparing or evaluating the responses of the interceptors to normally expected responses then intrusions may be identified, i.e. intercepted.

An interceptor may be a standalone circuitry among other logic units and/or may be interconnected with other units or circuitries.

In the context of the present disclosure, without limiting, referring to injection of faults imply effecting or inducing or otherwise bringing about faults or malfunctions in a circuitry.

In the context of the present disclosure, without limiting, a 'cell' implies a unit of logic or circuitry such as a standard cell of ASIC or a block in FPGA or any other units from a given library.

When a cell is set in a layout then, generally, the cell is associated with the interconnections thereof, the interconnections referred to also a 'net'.

Generally a cell is associated with parameters pertaining to the logic or circuitry thereof and, at least optionally, parameters or other information related to the nets or partial nets (subnets), that specify operational data of the cell and/or nets such as timings, delays or other data related to the a signal progression along a path of connections. The parameters are or may be provided by practice of the art such as in Standard Delay Format (SDF) file or in Synopsys Design Constraints (SDC) file.

The terms cited above denote also inflections and conjugates thereof.

One technical problem dealt by the disclosed subject matter is evaluating fault interception in integrated circuits in a pre-silicon design phase.

One technical solution according to the disclosed subject matter is incorporating in the design layout fault interceptors, subsequently injecting or effecting faults in the layout and determining the extent of detection of the faults.

The faults may be due to or generated by various phenomena or incidents and of various amounts and localities that may disrupt the proper operation of electronic circuitries and inducing or generating faults. For example, irradiation with a laser beam is focused and narrowly localized and may be of substantially high intensity or energy density. Or, for example, application of an electromagnetic field or an electric or a magnetic field that are less localized than a laser beam and may be of lower field density than a laser bream. Or, for example, any other phenomena such as heating that that generally dissipate and thus less localized at least then a laser beam.

A characteristic that may be common to the faults, at least partially, is increasing or altering electrons distribution and/or emissions that may adversely affect the operation of the electronic elements that, generally at least, are finely tuned and coordinated with connected elements.

In some embodiments, in order to increase the reliability of faults interception the amount and/or intensities of the faults are varied, for example the intensity of a laser beam is increased or the temperature is lowered.

Generally, in the design phase a fault is made perceptible by altering the timing response attributed to a logic element, the largest the intensity of the fault the largest the timing discrepancy due to capacities and/or inductions and/or Brownian motions.

For example, the largest the attributed laser intensity the fastest the response time since apparently there are more emitted electrons that reduce impedances, and the lower the cooling, i.e. decreased heating, the slower the response time as there are less free electrons relative to ordinary conditions.

One potential technical effect of the disclosed subject matter fault tolerant electronic circuitry at least in the sense of intercepting intrusions.

Another potential technical effect of the disclosed subject matter is a fault tolerant electronic circuitry at least in the sense of having and/or increasing the likelihood of occurrences of harmless faults in the interceptors rather than harmfully in other parts of the electronic circuitry.

A general non-limiting overview of practicing the present disclosure is presented below. The overview outlines exemplary practice of embodiments of the present disclosure, providing a constructive basis for variant and/or alternative and/or divergent embodiments, some of which are subsequently described.

FIG. 1 schematically illustrates, according to exemplary embodiments of the disclosed subject matter, a layout 100 of cells as instances of a cell 102 where some of the cells are interceptors and where each interceptor is denoted as an interceptor 104 and marked as 'CM detector'.

It is noted that any instance of cell 102 is not necessarily equal or equivalent to any other cell 102; likewise, it is noted that any instance interceptor 104 is not necessarily equal or equivalent to any other interceptor 104.

Layout 100 represents any layout of any extent and of any cells, and the quantity and locations and/or distribution of the interceptors in the layout represent any suitable and/or feasible allocation or configuration of interceptors in the layout. Determination of allocations and distributions of interceptors in a layout are further discussed later on.

By way of example, a laser beam scans a layout as if to intrude or infer the working of the circuitry the layout akin to techniques of the art.

FIG. 1B schematically illustrates layout 100 with a representation of a laser beam denoted as a beam 112 having a diameter denoted as a diameter 114 irradiating layout 100, according to exemplary embodiments of the disclosed subject matter.

FIG. 1C schematically illustrates a rectangular approximation of a circular beam, according to exemplary embodiments of the disclosed subject matter.

Since the layout is generally formed by rectangular cells, beam 112 is approximated and represented by a square 116. Accordingly, scanning by beam 112 is approximated by incrementally repeating square 116 over layout 100.

FIG. 2A schematically and concisely illustrates layout 100 with partitions based on repetitions of rectangular representations of a circular beam as square 116 akin to FIG. 1C, according to exemplary embodiments of the disclosed subject matter.

The incremental repetitions of square 116 divide layout 100 to partitions exemplarily denoted a 'S_00' to 'S_31', where each of the partitions pertains to or associated with cells and nets and vice versa, as arbitrarily exemplified in Table-1 below, where some exemplary cells are shown in FIG. 1C in square 116 respective to beam 112.

TABLE 1

| Partition | Nets |
|---|---|
| S-00 | NET3, NET36, AND21, . . . |
| S_01 | N563, NET4355, NOR324, . . . |
| . . . | . . . |
| S_31 | N42, MUX2, XOR34, . . . |

As square 116 divides layout 100 into partitions based on the size thereof, nets are or likely to be arbitrarily cut or disconnected. Therefore, in some embodiments, the associations of partitions with nets is carried out according to some guidelines or restrictions such as to assign any one of square 116 to a net likely to belong thereto and/or to avoid redundancies or supplication of nets in partitions.

FIG. 2B schematically and concisely illustrates the layout and partitions as of FIG. 2A with indications of partitions that are liable to intrusions according to evaluation of fault interceptions as outlined in FIG. 2C described hereinbelow, according to exemplary embodiments of the disclosed subject matter.

FIG. 2C schematically outlines operations 200 in evaluating fault interception, according to exemplary embodiments of the disclosed subject matter.

In operation 202 a diameter of a virtual beam imitating a laser beam is set, such as used in the art for intrusion or black-box analysis of circuits such as of ASIC.

Optionally, the diameter represents a diameter or an extent of other media, such as a cross-section of an electromagnetic irradiation.

In operation 204 the intensity of the beam is set as a timing factor that represents the effect on the timings and delays and/or signal progression in a cell or a net.

A potential rationale for representing the intensity by a timing factor is due to the effect of the beam on electrons quantity and/or distribution such as due to the photoelectric effect.

Optionally, the timing factor represents the intensity and/or energy density of an electromagnetic irradiation.

For brevity and unless otherwise specified, reference to a beam such as a laser bear represents, mutatis mutandis, any disruptive medium.

In operation 206 a layout comprising interceptors and provided for vulnerability evaluation is divided into partitions according to the diameter. Generally, a partition covers one or more cells and/or one or more nets or subnets, though a partition may not cover any component.

In operation 208 cells and nets or parts thereof pertaining to each partition are obtained or derived from the design of the layout.

In operation 210 a partition is selected. Generally though without limiting, a partition is selected from a corner of the layout as a first partition in a sequence to come, for example a partition denoted as 'S_00' in FIG. 2A.

In operation 212 the timings parameters of the cells and nets pertaining to the partition are modified by the timing factor, thus modeling, at least to some extent, the effect of the beam irradiating the partition.

The beam intensity as modeled generally affects a slowdown the operation or response of the cells and/or nets of the partition, though speedup of the operation or response of the cells and/or nets of the partition is not precluded.

Operation 212 is also labeled as 'A' for reference from a continuation of FIG. 2C on a subsequent page.

In operation 214 timing analysis of the cells and nets pertaining to the partition is performed to determine the virtual effect of the beam as modeled or mimicked.

Operations 200 proceed on a next page at a location labeled as 'B' as shown also by a dashed arrow 216.

In operation 218 it is checked whether a timing violation has been detected in the analysis. If the timing violation was not detected then control transfers to operation 224; otherwise the control transfers to operation 220.

In operation 220 it is checked whether the timing violation occurred in an interceptor. If the timing violation occurred in an interceptor then control transfers to operation 224; otherwise the control transfers to operation 222.

In operation 222 as timing violation occurred yet not in an interceptor the currently selected partition, inclusive of the cells and nets therein, is marked as liable to intrusion. The partition is marked by any technique such as by labeling, by grading, scoring or any other technique such registering or recording in a list or database.

Marking of a partition as liable to intrusion is figuratively exemplified in any a partition 118 in FIG. 2B that is darkened relative to any of partition 118 in FIG. 2A.

It is noted that whereas timing violation in a partition is considered as vulnerability, timing violation in an interceptor is considered as neutral or immaterial since the interceptors are not part of the circuitries of the layout per se, and apart from intercepting violations the interceptors are effectively or practically inert of inactive as the intended operation of the layout is concerned.

In operation 224, reached from operation 218 or 220, it is checked whether there are still pending partitions that were not handled.

If there are more pending partitions then control transfers to operation 226 where the next pending partition is selected, and control transfers to operation 212 labeled also as 'A' for an iteration on the currently selected partition as indicated by a dashed arrow 228; otherwise, if there are no more pending partitions then the evaluation is ended at least as the present pass or execution of operations 200 are concerned.

Consequently, in some embodiments, the layout is decided or determined as vulnerable if timing violations are detected outside the interceptors, optionally based on the amount and/or count of such violations, for example minor violations do not contribute to the vulnerability decision. Optionally or alternatively, some further operations or procedures are carried out such as reiteration and/or some terminal procedures.

In some embodiments, operations 200 are repeated or reiterated with different settings. For example, the beam is mimicked or modeled to virtually scan the layout in progressively incremented intensities to model more powerful intrusions. Likewise, the beam diameter may be altered and the beam is mimicked or modeled to virtually scan the layout in partitions of different size or sizes.

In some embodiments, after operations 200 have ended, some terminal procedures are performed. For example, the vulnerability of the layout is evaluated and accordingly interceptors are added to and/or moved in the layout and optionally interceptors are removed. Generally, in some embodiments, after such modifications the vulnerability of the layout is evaluated again as with operations 200 as described above.

It is noted that timing violations are generally determined within some tolerance or tolerances. Generally, timing tolerances vary between locations in a design according to the gates or logic elements and connections therebetween and length of the connections. In some cases, the tolerances are based on the clock and/or propagation time of signals between elements in the design, and further possibly also on the nature of the elements where some elements may be more sensitive to timing variations and others may be more robust or resilient to such variations.

The order and/or functions of operations 200 are provided as an example and may be varied or modified.

For example, setting the timing factor may precede the setting of the diameter, or obtaining of nets pertaining partitions may be performed separately for each selected partition, or setting a beam diameter and intensity may be done in combination or in parallel.

Whereas the bean scans the layout, in some embodiments less localized and/or overall faults are generated in the layout, and to pinpoint the faults the partitions may be checked as or like in operations 200 according to partitions or granularity, where the sizes of the partitions or extents of the granularity are not dependent of the beam diameter.

In some embodiments, the partitions are not necessarily square or rectangular. For example, hexagonal partitions may be used that, at least potentially, represent circular areas better than rectangular ones.

In some embodiments, some overlap between partitions is allowed such as for better separation of the functionality of cells and nets.

It is noted that timing violations are provided as exemplary faults, and other faults may be detected and analyzed detected in a similar or a variant manner and under the scope of the present disclosure. For example, anomalous current or voltage or unstable states may be detected and analyzed and vulnerably of the layout may be determined and evaluated, mutatis mutandis, as with respect to timing.

Generally, there is a tradeoff between the quantities of interceptors and/or density thereof in a layout and between other factors or constrains.

Although, naively, having as many interceptors as aspired is beneficial, yet having numerous interceptors may increase the size of the design and/or power consumption and/or heat generation and/or facing other detrimental aspects as complexity of the design or not leaving sufficient 'real estate'.

Thus, in some embodiments, a balance or tradeoff between the umber of interceptors and the functionality thereof is determined, such as by a suitable distribution of interceptors and, optionally, taking into account which sections of the design are more sensitive and/or vulnerable than others.

In some embodiments, some heuristic programs and/or guidelines are designed and/or implemented for distribution of interceptors, optionally in combination with other techniques.

In some embodiments the distribution of interceptors in a layout is expressed to some qualitative and/or quantitative extent. For example, an expression as (number of partitions with at least 1 interceptor/(total number of partitions), or an expression as (number of partitions in which timing violation has been identified)/(total number of partition).

Further, in some embodiments, quantitative expressions such as above may be used as goal functions to determine interceptors' distribution in a layout, possibly with adjustments and/or fine tuning by other factors such as sensitivity or complexity.

It is noted that that in addition and/or as an alternative to detecting and analyzing faults with respect to interceptors and the rest of the layout, in some embodiments the response of the interceptors to intrusions are used to determine whether the layout was intruded and, optionally, in what region of the layout.

Having sufficient dense distribution of interceptors—possibly taking into account limitations and constraints noted hereinabove—the likelihood or reliability of intrusion detection by the interceptors may be increased or at least satisfactorily achieved and, optionally, with better localization of the intrusion.

The objective of the procedures of the present application is achieving a circuit, for example as in a microchip or as any other implementation such as an ASIC or a part of a VLSI product, where the circuit is safe to intrusions at least practically and/or to some considerable or suitable extent.

To attain the objective various electronic design tools are used, for example, coding by register transfer language (RTL), compiling or converting the code to the basic logic elements netlist and mapping by specific digital standard cells library for microchip fabrication plant/process (FAB) technology and placement of the cells in a layout.

Further, having the layout interceptors are incorporated therein based on at least timing analyses and further some other functions such as quantitative expressions noted above, involving iterative operations to obtain at least an apparently of a sufficiently secure design in the sense of protection against intrusions and/or detecting intrusions before damage is done.

Evidently and clearly the mechanisms and operations as described above are far beyond the capabilities of humans, even aided by pencil-and-paper or calculators, and can only be carried out by machinery such as electronic processors using integrated and/or separate devices of memory, input/output and/or other functionalities such as communications.

Thus, undoubtedly, the mechanisms and procedures disclosed herein are tied to a machine for the implementation thereof.

Accordingly, operations 200 and design phases of a layout such as layout 100 are carried out by a computerized system operating at least one processor.

There is thus provided according to the present disclosure a computerized mechanism for vulnerability evaluation in a layout having circuitry units as interceptors, comprising receiving a layout with interceptors incorporated therein at prearranged positions, virtually inducing faults in the layout by modeling a physical phenomenon that affects timings in the layout, detecting timing violations in the layout responsive to the induced faults based on discrepancies between the timings and provided specifications thereof determining vulnerability of the layout to faults according to detected faults, and wherein the method is performed on an at least one computerized apparatus configured to perform the method.

In some embodiments, the physical phenomenon is a virtual laser beam having an intensity represented by a time factor and a diameter according which the layout is divided into partitions of cells and nets, the beam scanning the layout by the partitions and altering in the partitions specified timings of the cells and nets according to the time factor, and wherein detecting timing violations in the layout comprises detecting in each partition discrepancies between the timings of the cells and nets and provided specifications thereof, and wherein determining vulnerability of the layout to faults is according to detected timing violations outside of the interceptors.

In some embodiments, virtually inducing faults in the layout by modeling a physical phenomenon that affects timings in the layout then detecting timing violations in the layout responsive to the induced faults then determining vulnerability of the layout to faults according to detected faults is repeated at least one more times with different intensities that differently affect timings in the layout.

In some embodiments, virtually inducing faults in the layout by modeling a physical phenomenon that affects timings in the layout then detecting timing violations in the layout responsive to the induced faults then determining vulnerability of the layout to faults according to detected faults is repeated at least one more times with different extents of the modeled physical phenomenon thus differently affecting timings in the layout.

In some embodiments, the positions of the interceptors in the layout is modified responsive to determining vulnerability of the layout to faults and further repeating the mechanism for further checking of the vulnerability of the layout to faults.

In some embodiments, the quantity of the interceptors in the layout is modified responsive to determining vulnerability of the layout to faults and further repeating the mechanism for further checking of the vulnerability of the layout to faults.

In some embodiments, the positions and quantity of the interceptors in the layout are modified responsive to determining vulnerability of the layout to faults and further repeating the mechanism for further checking of the vulnerability of the layout to faults.

In some embodiments, determining vulnerability of the layout to faults according to detected faults is based on detections of timing violations in the interceptors.

In some embodiments, the modeled physical phenomenon is a modeled electromagnetic irradiation.

In some embodiments, the modeled physical phenomenon is a modeled heating.

In the context of some embodiments of the present disclosure, by way of example and without limiting, terms such as 'operating' or 'executing' imply also capabilities, such as 'operable' or 'executable', respectively.

Conjugated terms such as, by way of example, 'a thing property' implies a property of the thing, unless otherwise clearly evident from the context thereof.

The terms 'processor' or 'computer', or system thereof, are used herein as ordinary context of the art, such as a general purpose processor or a micro-processor, RISC processor, or DSP, possibly comprising additional elements such as memory or communication ports. Optionally or additionally, the terms 'processor' or 'computer' or derivatives thereof denote an apparatus that is capable of carrying out a provided or an incorporated program and/or is capable of controlling and/or accessing data storage apparatus and/or other apparatus such as input and output ports. The terms 'processor' or 'computer' denote also a plurality of processors or computers connected, and/or linked and/or otherwise communicating, possibly sharing one or more other resources such as a memory.

The term computerized apparatus or a computerized system or a similar term denotes an apparatus comprising one or more processors operable or operating according to one or more programs.

The flowchart and block diagrams illustrate architecture, functionality or an operation of possible implementations of systems, methods and computer program products according to various embodiments of the present disclosed subject matter. In this regard, each block in the flowchart or block diagrams may represent a module, segment, or portion of program code, which comprises one or more executable instructions for implementing the specified logical function (s). It should also be noted that, in some alternative implementations, illustrated or described operations may occur in a different order or in combination or as concurrent operations instead of sequential operations to achieve the same or equivalent effect.

The corresponding structures, materials, acts, and equivalents of all means or step plus function elements in the claims below are intended to include any structure, material, or act for performing the function in combination with other claimed elements as specifically claimed. As used herein, the singular forms "a", "an" and "the" are intended to include the plural forms as well, unless the context clearly indicates otherwise. It will be further understood that the terms "comprises" and/or "comprising" and/or "having" when used in this specification, specify the presence of stated features, integers, steps, operations, elements, and/or components, but do not preclude the presence or addition of one or more other features, integers, steps, operations, elements, components, and/or groups thereof.

The terminology used herein should not be understood as limiting, unless otherwise specified, and is for the purpose of describing particular embodiments only and is not intended to be limiting of the disclosed subject matter. While certain embodiments of the disclosed subject matter have been illustrated and described, it will be clear that the disclosure is not limited to the embodiments described herein. Numerous modifications, so changes, variations, substitutions and equivalents are not precluded.

The invention claimed is:

1. A computerized mechanism for vulnerability evaluation in a layout having circuitry units as interceptors, comprising:

receiving the layout with interceptors incorporated therein at prearranged positions;

modeling a physical phenomenon that affects timings in the layout, to set a time factor and a diameter that represent an intensity of the physical phenomenon;

dividing the received layout into partitions, wherein the size of the partitions is determined according to the diameter, and wherein each partition has circuitries pertaining to the partition;

altering timings of circuitries pertaining to at least one of the partitions, the altering is according to the set time factor;

detecting timing violations in the at least one of the partitions responsive to the altered timings based on discrepancies between the timings and provided specifications thereof;

determining vulnerability of the layout to faults in case a timing violation is detected in at least one of the partitions outside of the interceptors; and wherein the method is performed on an at least one computerized apparatus configured to perform the method.

2. The computerized mechanism according to claim 1, wherein the partitions includes cells and nets, and the physical phenomenon scans the layout by the partitions, and wherein detecting timing violations in the layout comprises detecting in each partition discrepancies between the timings of the cells and nets and provided specifications thereof.

3. The computerized mechanism according to claim 1, wherein modeling the physical phenomenon that affects timings in the layout then detecting timing violations in the layout responsive to the induced faults then determining vulnerability of the layout to faults according to detected faults is repeated at least one more times with different intensities that differently affect timings in the layout.

4. The computerized mechanism according to claim 1, wherein modeling the physical phenomenon that affects timings in the layout then detecting timing violations in the layout responsive to the induced faults then determining vulnerability of the layout to faults according to detected faults is repeated at least one more times with different extents of the modeled physical phenomenon thus differently affecting timings in the layout.

5. The computerized mechanism according to claim 1, wherein the positions of the interceptors in the layout is modified responsive to determining vulnerability of the layout to faults and further repeating the mechanism for further checking of the vulnerability of the layout to faults.

6. The computerized mechanism according to claim 1, wherein the quantity of the interceptors in the layout is modified responsive to determining vulnerability of the layout to faults and further repeating the mechanism for further checking of the vulnerability of the layout to faults.

7. The computerized mechanism according to claim 1, wherein the positions and quantity of the interceptors in the layout are modified responsive to determining vulnerability of the layout to faults and further repeating the mechanism for further checking of the vulnerability of the layout to faults.

8. The computerized mechanism according to claim 1, wherein determining vulnerability of the layout to faults according to detected faults is based on detections of timing violations in the interceptors.

9. The computerized mechanism according to claim 1, wherein the modeled physical phenomenon is a modeled electromagnetic irradiation.

10. The computerized mechanism according to claim 1, wherein the modeled physical phenomenon is a modeled heating.

11. The computerized mechanism according to claim 1, wherein the modeled physical phenomenon is a virtual laser beam.

* * * * *